Sept. 4, 1956

O. A. STALLING 2,761,686

RECORD PLAYER

Filed March 15, 1952

4 Sheets-Sheet 1

INVENTOR.
Otto A. Stalling
BY Dawson & Ooms
Attys.

INVENTOR.
Otto A. Stalling
BY Dawson + Ooms
Attys.

Sept. 4, 1956

O. A. STALLING 2,761,686

RECORD PLAYER

Filed March 15, 1952

4 Sheets-Sheet 3

INVENTOR.
Otto A. Stalling

BY Dawson + Dons

Attys.

Sept. 4, 1956 O. A. STALLING 2,761,686

RECORD PLAYER

Filed March 15, 1952 4 Sheets-Sheet 4

INVENTOR.
Otto A. Stalling
BY Dawson & Ooms
Attys.

2,761,686

RECORD PLAYER

Otto A. Stalling, Evanston, Ill., assignor of one-half to Bettin Stalling, Chevy Chase, Md.

Application March 15, 1952, Serial No. 276,823

8 Claims. (Cl. 274—10)

This invention relates to record players; in particular, it concerns a novel and improved automatic record player adapted to play consecutively or in any desired order a plurality of phonograph records.

The invention also relates to a novel record-carrying case, and to the combination thereof with my novel record player.

The particular embodiment of my invention described in detail in this specification is especially adapted to playing records of the type having a relatively large central aperture for accommodating a spindle of substantial diameter. By modifications which will be easily understood by persons skilled in the record-playing art, however, my invention may be adapted to playing other types of records as well.

A major object of the present invention is to provide an automatic record player adapted to receive a stack of records and to play the same automatically in sequence or, if a different sequence be indicated by manual adjustment, play the records in any sequence desired.

Another object of the present invention is to provide an automatic record player which, when it has finished playing all the records in the stack supplied to it, will start in again on the first record in the stack and play the stack through again in sequence.

Still another object of my invention is to provide apparatus adapted to permit permanent storage of records in protective casings which will keep a plurality of records permanently filed in a particular order, the record-player apparatus being adapted to play either side of any record in the casing at will without the necessity for disturbing the order of the records filed therein.

Still another object of my invention is to provide a novel combination wherein my record-storage casing and my automatic record player cooperate to permit a stack of records filed in such a casing to be played, in whatever order may be desired, removed from the record player, and re-filed without ever being exposed to damage or possible breakage by being handled individually.

Other objects and advantages of my invention will appear as the specification proceeds.

I have in the appended drawing shown in considerable detail an illustrative embodiment of my automatic record player and the novel record-filing case which is adapted for use in cooperation with my record player. (It should be understood that my record player can be used independently of my novel filing case as well as in combination with it.)

Figures 1, 2, 3, 4, 5, 6, 7:
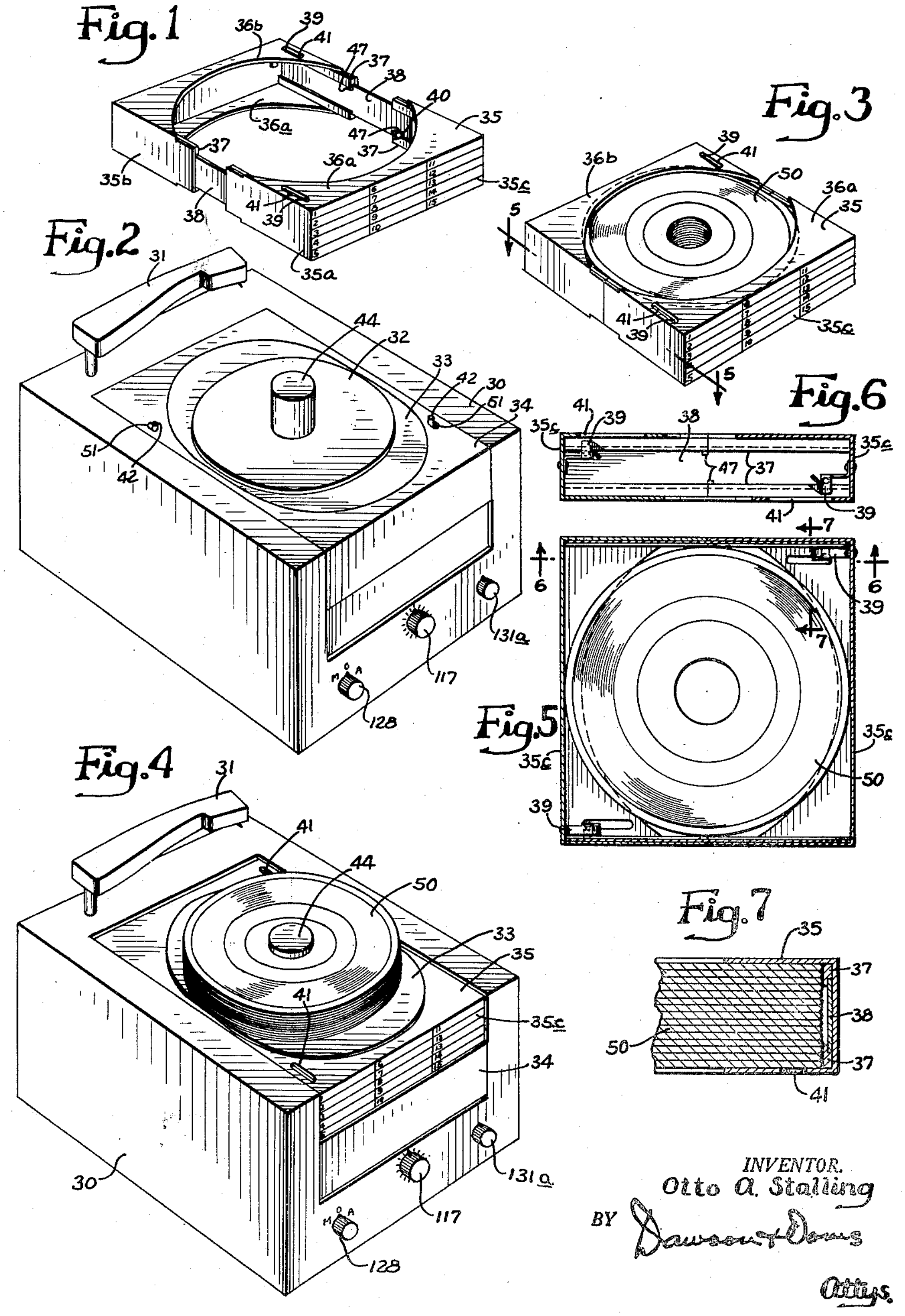
Figure 8:
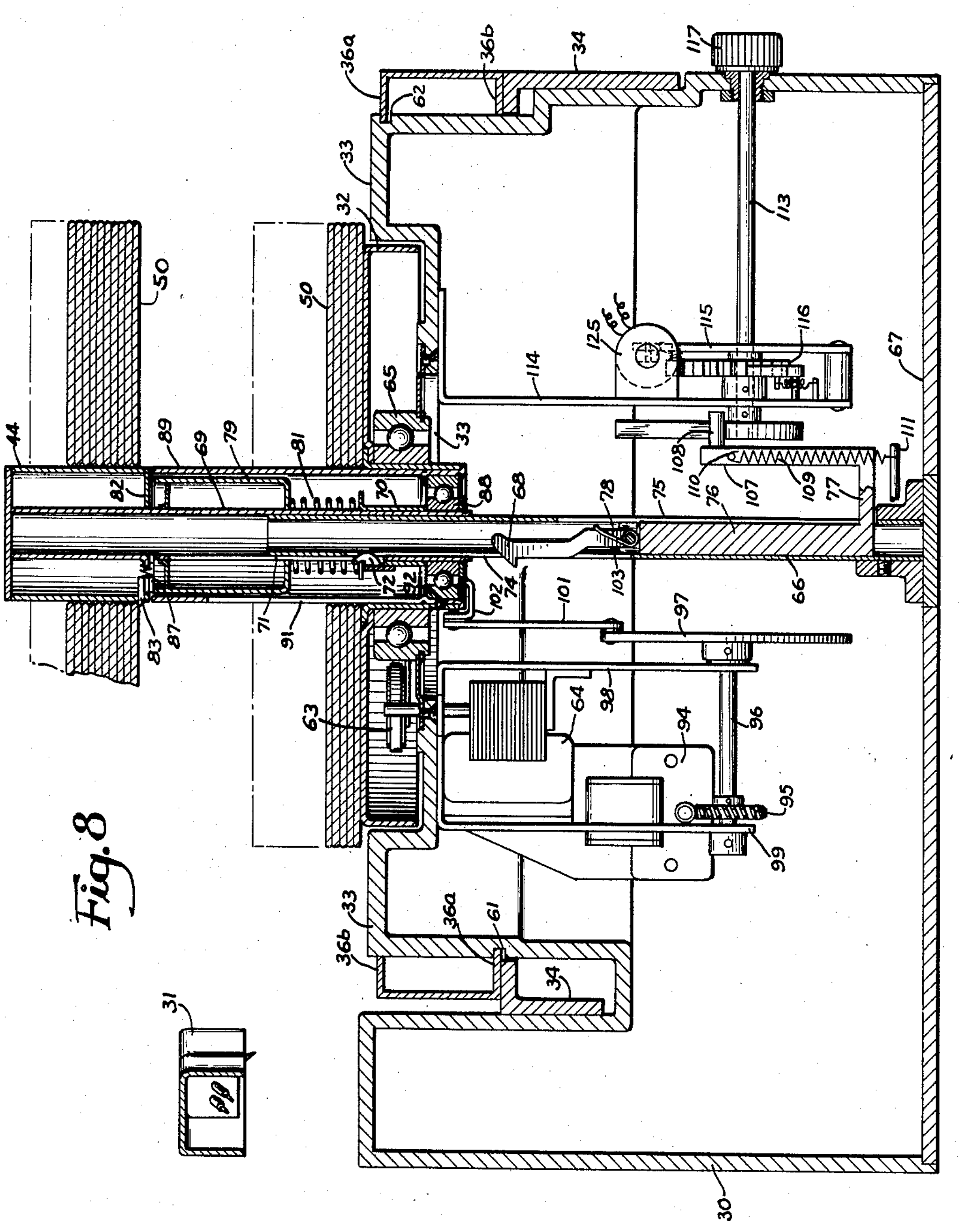
Figure 9:
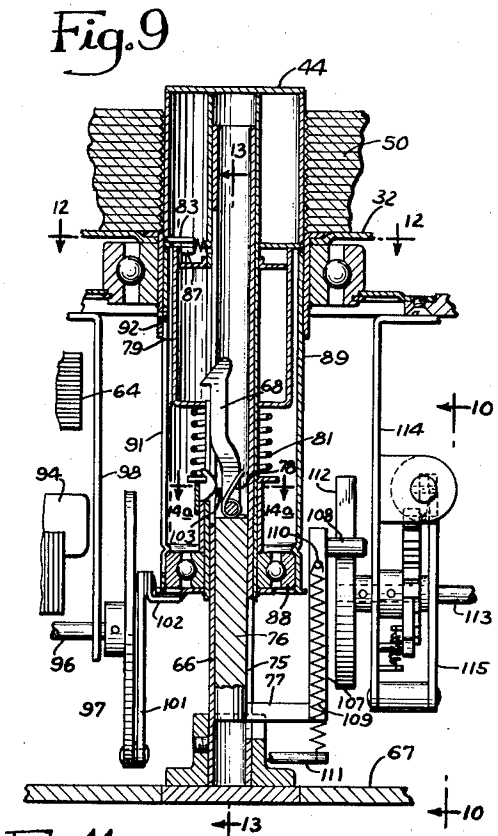
Figure 10:
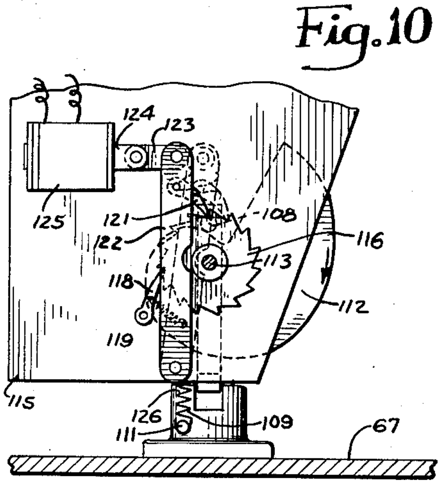
Figure 11:
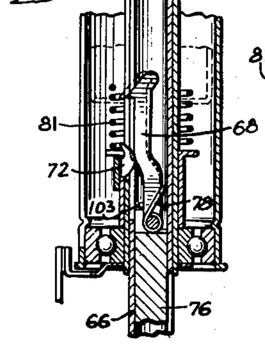
Figure 12:
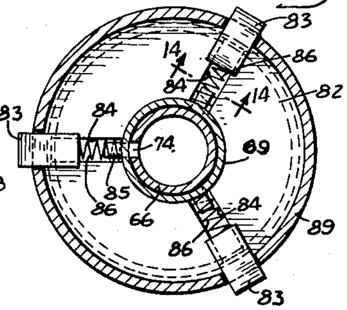
Figure 13:
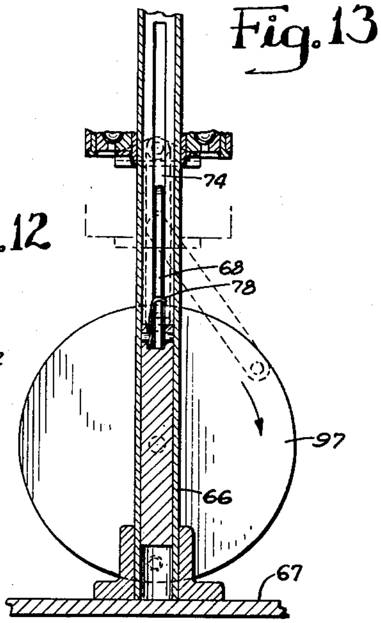
Figure 14A:
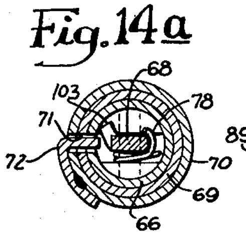
Figure 14:
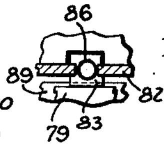
Figure 15:
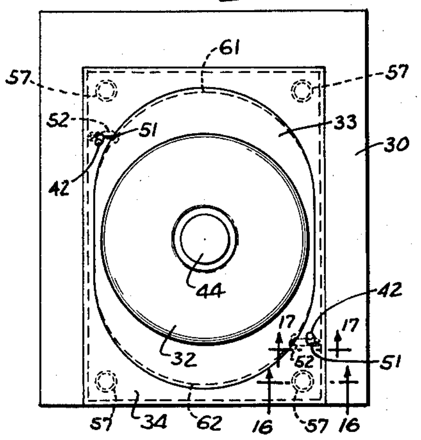
Figure 16:
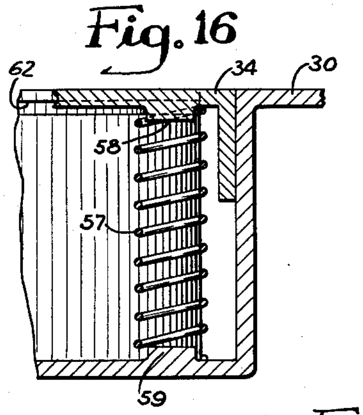
Figure 17:
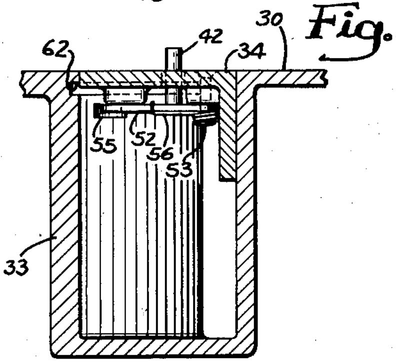
Figure 18:
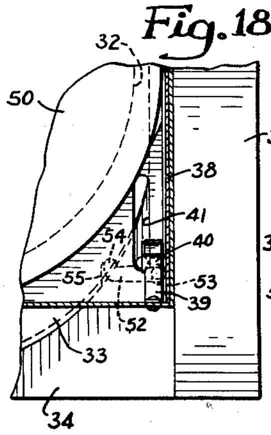
Figure 19:
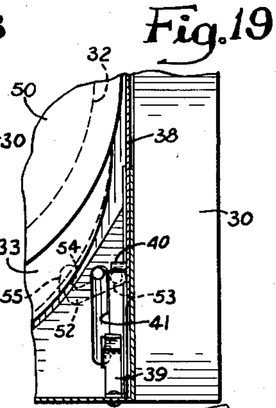
Figure 20:
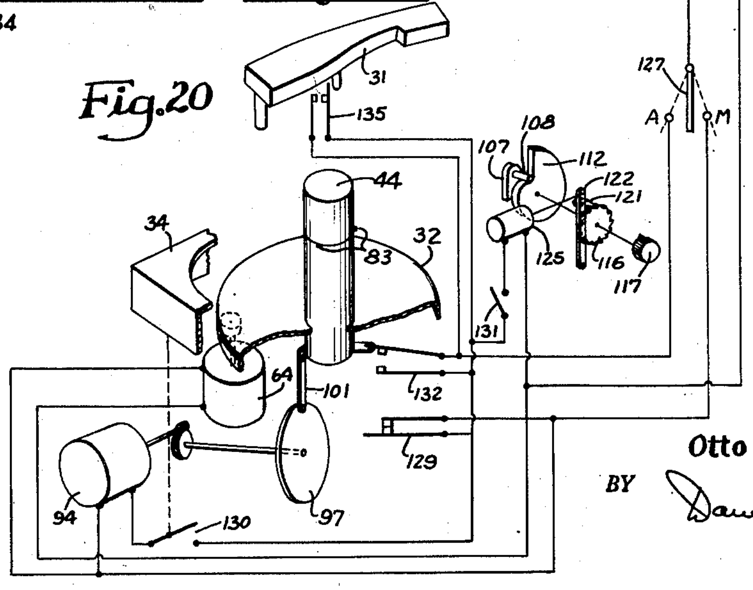

In the drawing, Figure 1 is a perspective view of my novel record-filing case as it appears when opened for insertion of records. Fig. 2 is a perspective view showing the external appearance of a typical record player embodying my invention and adapted for use with the record-filing and storage case of Fig. 1. Fig. 3 is a perspective view of the record-filing and storage case of Fig. 1 as it appears when a stack of records has been placed therein and the case has been closed and latched for storage. Fig. 4 is a perspective view of my record player generally similar to Fig. 2 except that it shows the record player as it appears when the record-storage case of Fig. 3 has been placed thereon, opened, and pushed downward into operating position, leaving the stack of records deposited on the turntable. Fig. 5 is a transverse sectional view through my record-storage casing, taken along the line 5—5 of Fig. 3. Fig. 6 is a vertical sectional view of my record-storage case, taken along the line 6—6 of Fig. 5 and showing the latch mechanism which normally holds the case in closed position. Fig. 7 is a fragmentary sectional view, taken along the line of 7—7 of Fig. 5, showing the snug manner in which a stack of records (fifteen in the illustrated case) may be stored and protected within my novel record-storage case. Fig. 8 is a vertical sectional view showing the principal operating mechanism of the record player of Fig. 2; in Fig. 8, the apparatus is shown with the moving parts in the position which they normally occupy immediately after a record change has been accomplished and the instrument is about to commence playing a new record. Fig. 9 is a fragmentary sectional view of part of the apparatus shown in Fig. 8, the moving parts being shown in the position they occupy when the retractable spindle or record-support member is at its lowest position. Fig. 10 is a fragmentary view, partly in section, taken along the line 10—10 of Fig. 9, showing the construction of the solenoid-actuated ratchet-and-cam mechanism which forms a part of my novel record player. Fig. 11 is a fragmentary view, mostly in section, showing some of the apparatus in the spindle or record-supporting element of my invention, illustrating the mode of operation of certain of the moving parts therein during the rising or advancing movement of the record-supporting element. Fig. 12 is a horizontal sectional view taken along the line 12—12 of Fig. 9, bringing out in considerable detail the construction of the spring-urged pawls which, carried within the spindle or record-supporting element, play an important part in the record-changing-and-selecting mechanism. Fig. 13 is a fragmentary vertical sectional view, taken along the line 13—13 of Fig. 9, showing the structural details of the central post which supports the spindle or record-supporting element. Fig. 14 is a small sectional view, taken along the line 14—14 of Fig. 12, showing further structural details of the spring-urged pawls of Fig. 12. Fig. 14*a* is a sectional view, taken along the line **14*a*—14*a* of Fig. 9, showing the construction of a dog member which functions during the rising movement of the spindle or record-supporting element to release the main record-selecting pawl. Fig. 15 is a plan view of the record player of Fig. 2, showing the manner in which the carrying case of Fig. 1 may be received on the retractable supporting platform of the record-player cabinet. Fig. 16 is a fragmentary sectional view showing the manner in which a retractable case-receiving platform in the record-player cabinet is supported. Fig. 17 is a fragmentary sectional view, taken along the line 17—17** of Fig. 15, bringing out the structural detail of a latch mechanism. Figs. 18 and 19 are fragmentary sectional views bringing out other structural details of the latch mechanism of Fig. 17. Fig. 20 is a schematic wiring diagram showing the electrical wiring of the record-player apparatus.

Referring now to the drawing, I have shown in Fig. 2 a typical embodiment of my record player assembled in a table cabinet 30. The record player includes a tone arm 31, mounted, as usual, near one corner of the cabinet, and a turntable 32 mounted centrally of the top of the record-player cabinet. The turntable is carried on the structural frame of the cabinet, which may be formed of fiber, wood, metal stamping, or other suitable material. The portion of the frame which directly supports the turntable 32 may be seen in Fig. 2 and is marked with the reference numeral 33. As may be seen from Fig. 2, that frame portion 33 is generally oval in shape, being substantially the same width across its short dimension as the diameter of the turntable but being appreciably larger in its long dimension. Surrounding the frame portion 33 is a retractable, spring-supported platform 34. (See Figs. 8 and 16.)

I have provided, as a cooperating structure which may be used with my record player, a record-carrying or storage case 35, shown in perspective in Fig. 1. Case 35 consists of a pair of symmetrical end pieces 35*a* and 35*b*, formed with a generally box-like construction but having their top and bottom members partially cut away to form arcuate leaves 36*a* and 36*b* respectively. Leaves 36*a*, it will be noted (see Figs. 1 and 8), are on diagonally opposite sides of the case and are thicker in the horizontal dimension than the other two leaves, which are designated 36*b*. The symmetrical members 35*a* and 35*b* are provided along their corresponding sides with channels 37 which serve as tracks or ways for a pair of guide strips 38, each of which is freely slidable within the channels 37 except as restrained by the latches about to be described.

The two halves of the record-storage case 35 are held together by four latches 39. The latches are disposed in pairs, one pair on one side of the case and the other pair on the other side, diametrically opposed. As may be seen from a study of perspective Figs. 1 and 3, this arrangement of latches causes two of the latches to be on the lower side of the case, in the same relative position, no matter which side of the case is uppermost. The latches 39 cooperate with projections or dogs 40 which are carried on the sides of guide strips 38 near their respective ends. (See Figs. 18–19.)

The ways or channels 37 are provided near their respective ends with stop members 47 which will engage dogs 40 when the parts 35*a* and 35*b* are pulled apart, thus limiting the maximum range of relative movement of the members 35*a* and 35*b*.

It will be understood, from the foregoing description and Figs. 1 and 3, that when the two halves 35*a* and 35*b* of carrying case 35 are telescoped together, as shown in Fig. 3, all four of the latches 39 will be engaged with their respective dogs 40. Release of either diametrically opposed pair of latches, however, will permit the case to be telescoped outward into the position shown in Fig. 1, in such event one of the guide strips 38 moving relatively to one of the case members and the other guide strip 38 moving relatively to the other case member.

Each of the latches 39 has associated with it an elongated slot 41; as may be seen from Fig. 6, a pin passing through slot 41 and pressing upward on latch 39 will release the latch from its corresponding dog 40.

Retractable platform 34 of the record player carries such a pair of pins 42 positioned near diametrically opposed corners and spaced so as to fit within slots 41 and to engage the bottom pair of latches 39 whenever a closed record case 35 is placed on the platform 34.

As may be seen from Fig. 2, a spindle or record-support element 44 is carried centrally of the turntable 32, and records 50 placed in the carrying case 35 are aligned by the case when closed (see Fig. 5) so as to place their central apertures into axial alignment in the center of the case.

As I have stated heretofore, the embodiment of my invention described in the drawing is particularly adapted for use with records of the type having a relatively large central aperture, and the records 50 shown in the drawing are of that type.

As shown in Fig. 7, case 35 is adapted to receive 15 records; that choice is of course an arbitrary one, and the proportions of case 35 may be chosen to accommodate any desired number of records.

As will be hereinafter more fully explained, my invention permits the playing, at will, of any record in a given stack, without the necessity for manually rearranging the same. Accordingly, it is unnecessary to change the order of records in a given case 35 once they have been filed therein. For convenience in access to the records, therefore, the opposite ends 35*c* may be provided with index plates or cards on which the titles of the various selections of the filed records may be entered. The cards 35*c* may be inverted relative to one another, so that the user, after reading the selections on one of the cards must invert the case 35 to read the opposite card. Thus one card 35*c* may list the selections found on the "A" sides of the records and the other card 35*c* may list the selections found on the "B" sides of the records. By inverting the cards as suggested, the user will then always have the case 35 in the proper position to play the selections on that particular index card which he is reading.

When a user desires to play one or more of the records filed in a particular case 35, he may put the closed case down on the upper surface of the record player, allowing the central apertures of the records to pass over spindle 44. The pins 42 enter slots 41, press on the lower pair of latches 39, and release them. This permits the user to slide the two portions 35*a* and 35*b* of case 35 forward and backward respectively, the pins 42 moving through slots 41.

Pins 42 (see Fig. 17) are carried within short slots 51 cut into the top of retractable platform 34. Pins 42 are integrally formed with or rigidly joined to pivoted latch members 52, pivoted by pins 53 to the under side of the top of platform 34. The free end of each latch member 52 is modified to form a hook or projection 54 which is adapted to be received within a recess 55 formed in the side wall of central frame portion 33. Each of the latch members 52 is equipped with a spring 56 tending to urge the latch 52 into the recess 55.

When, in being slid apart, the respective halves of record case 35 reach a predetermined separation, the pins 42 engage against the ends of the slots 41. At that point, further separation of the respective halves of case 35 moves the pins 42 against the force of the springs 56 and thus releases latches 52 from recesses 55. That permits the platform 34 to be retracted.

Platform 34 is suspended on four coil springs 57, seated between bosses 58 and 59, formed respectively on the under side of platform 34 and on the upper surface of frame 30.

As the latches 55 are released, the user presses the record case 35 downward until the fully retracted position shown in Fig. 8 is reached. Frame portion 33 is provided with a pair of horizontal elongated recesses 61 and 62, designed to accommodate respectively the arcuate edges 36*a* of the case elements 35*a* and 35*b*, as shown in Fig. 8. When the platform 34 has been fully retracted, the user can engage the arcuate edges of the case 35 with recesses 61 and 62 by merely squeezing the two portions of the case slightly toward one another. That movement will lock the case 35 in its retracted position and the force of springs 57 will hold the case in that position until the user is prepared to remove the record case from the instrument. At that time, release of the members 35*a* and 35*b* is accomplished merely by pressing down on them slightly and moving them a short distance apart. They will then rise under the urging of springs 57 and, when platform 34 reaches the normal position shown in Fig. 16, the latches 52 will engage recesses 55. The case members 35*a* and 35*b* can then be slid together to envelop the stack of records 50, lifted from the instrument, and finally pressed fully together, latching the latches 39 and placing the case in condition for storage.

It will be understood that while the case 35 is on the instrument in the position shown in Fig. 8, the stack of records normally contained within the case 35 is deposited on the turntable 32.

That completes my description of the construction of my novel record-filling and storage case, and of the manner in which the same is placed on the record player and retracted to deposit its stack of records on the turntable.

I shall now take up in detail the construction of the record-player apparatus proper.

Any suitable provision for rotating the turntable 32 may be made; in the drawing, I have shown a rim-drive arrangement comprising friction wheel 63 and motor 64, the motor being provided with a suitable step-down gear transmission (not shown). Turntable 32 is mounted on the central frame portion 33 by means of any suitable bearings, such as anti-friction bearings 65.

Suitable mechanical linkage (not shown) is provided to associate motor 64 and tone arm 31 so that during all periods in which the record player is functioning automatically the tone arm 31 will be raised from the records when it has completed the playing of a record, swung outward to a point clear of the record stack, held there until after the record-changing operation has taken place, then returned to the proper position for starting a new record, and then lowered to engage the starting groove of the record next to be played.

Such linkage for connecting the tone arm and turntable driving motor forms a conventional part of every automatic record changer, is well known to those skilled in the art, and need not be described in detail in the present specification. Such mechanical arrangement may take any of the well-known conventional forms.

A central supporting post 66 is suitably mounted on the base or bottom plate 67 of cabinet 30, post 66 being oriented so as to be coaxial with turntable 32. Post 66 extends upward to a point slightly below the level of the topmost of a full stack of records resting on the turntable. Post 66 is hollow, as may be seen from Figs. 8 and 9, and it contains within it the record-selecting pawl 68 which forms an important part of the present invention. Slidably fitted over post 66, telescopewise, is a tube 69 extending upward centrally of and to the top of spindle 44. The upper portion of spindle 44, a cylindrical member whose outer diameter is adapted to receive snugly the central apertures of records 50, is secured by brazing, welding, or other suitable means to the top of slidable sleeve 69.

Sleeve 69 carries, near its lower end, an annular spring seat 70, spot welded or otherwise secured to sleeve 69. It also contains an elongated axial slot 71 through which passes, near its lower end, a cam element 72, spot welded or otherwise secured to the shank of spring seat 70 and projecting a gently curved face through slot 71 and also through an elongated axial slot 74 in post 66.

Post 66 is provided with another elongated axial slot 75, diametrically opposed to slot 74. Record-selecting pawl 68 is pivotally mounted on a slidable plunger 76 carried within the lower portion of post 66 and having an arm or orthogonal extension 77, passing outward through slot 75. Pawl 68 is urged in the direction of slot 74 by means of a coil spring 78.

A cup-shaped latch member 79 is slidably mounted on sleeve 69 and is adapted to rest normally on the upper surface of coil spring 81, the lower end of which sets on spring seat 70.

Extending radially from post 69 immediately above the cup-shaped latch member 79 is a plate 82 welded, brazed, or otherwise rigidly secured to sleeve 69. (See Figs. 12 and 14.) Carried on plate 82, which may be joined at its outer rim to the lower end of sprindle 44, are three symmetrically disposed pawls 83, slidably mounted for retractible movement along slots 84 in plate 82. Pins 85 project outwardly along the slots 84 from sleeve 69, serving as spring seats for coil springs 86, the outer ends of which seat in recesses provided therefor in pawls 83 and thus normally urge pawls 83 outward.

Slots 84 terminate a short distance inward of the outer periphery of plate 82, and the rim of plate 82 thus serves to arrest or limit outward movement pawls 83.

The lower sides of pawls 83 are provided with "steps" or projections 87. Normally the steps 87, urged outward by springs 86, press against the outer ends of slots 84. When the pawls 83 are retracted, however, as will be more fully described in a subsequent paragraph hereof, the steps 87 become trapped behind the rim of the cup-shaped latch member 79, urged upward by spring 81. When that occurs, the latch member 79 holds the pawls 83 in retracted position until latch member 79 is released.

At its lower end sleeve 69 carries anti-friction bearings 88. Supported on bearings 88 is a cylindrical element 89, of equal diameter to spindle member 44 and extending upward to a point immediately below plate 82. Lower spindle member 89 is provided with a long axial slot 91 which receives a key or pin 92 carried by the hub portion of turntable 32. Key 92 and slot 91 cooperate to cause cylindrical member 89 to rotate at all times in synchronism with turntable 32, while leaving lower spindle member 89 free to move axially relative to the turntable.

Axial movement of sleeve 69, the spindle members 44 and 89, and the other parts associated with them, is accomplished by means of a motor 94, mounted on the frame of the instrument below motor 64. Motor 94 drives a worm reducing gear 95 which is in turn linked by means of a shaft 96 to a crank wheel 97. Brackets 98 and 99 provide bearings for shaft 96. A link 101 is pivoted to the rim of crank wheel 97 and also to a pivot bracket 102 suitably secured to the bottom end of sleeve 69. Thus a single rotation of wheel 97 will move the sleeve 69 and its associated spindle members from the raised position shown in Fig. 8 to the lowered position shown in Fig. 9 and then back again in the upper direction to the Fig. 8 position.

The pawl 68 occupies the position shown in Fig. 8 whenever the sleeve 69 and its associated spindle elements are raised, the pawl 68 being held against advance beyond the position shown by means of stop member 103, bearing against upper end of plunger 76. As sleeve 69 comes down, during the first part of a cycle of operation by motor 94, the slanted upper surface of pawl 68 is engaged by sleeve 69 and pawl 68 is moved inward. Similarly, the pawl is retracted further to pass the cam-shaped dog 72, it moves forward again until arrested by its stop after the passage of cam 72, but pawl 68 is again retracted to permit passage of the lower edge of cup-shaped latch member 79.

As the sleeve 69 and its associated spindle members are lowered by motor 94, the pawls 83 engage the top record 50 on the turntable 32. The lower edges of the pawls 83 are beveled, so that they are pushed inward by contact with the records and, when they become fully retracted, the pawls 83 are latched in retracted position by cup-shaped member 79, which rises under the urging of spring 81 and engages steps 87.

It will be evident from a study of Fig. 9 that as the sleeve 69 and the spindle members 89 and 44 start upward the square lower face or hook portion of pawl 68 will engage the bottom of the cup-shaped latch member 79 at some point in its upward travel and will hold member 79 against further upward movement. Since sleeve 69 and spindle member 44 will continue to rise, the restraint on latch member 79 will release the pawls 83 and permit them to move outward, thus splitting the stack of records and causing all those records above the pawls 83 to rise with the spindle, leaving the others to rest on the turntable.

As the sleeve 69 and the spindle continue their upward movement, spring 81 is momentarily compressed, but as soon as the cam-shaped dog 72 engages the curving forward edge of pawl 68 (see Fig. 11), pawl 68 will be forced into retracted position, and latch member 79 will thereupon be released and free to move upward into its normal position resting on steps 87.

From the foregoing description of the operation of my record player, it will be seen that the particular record to be exposed on the top of the turntable stack in any given cycle of movement will depend upon the position of the pawl 68, and, by appropriate axial movement of the plunger 76, pawl 68 may be caused to select for playing any desired record of the group being carried by the spindle members 44 and 89.

Controlled axial movement of plunger 76 is accomplished by means of a cam-and-ratchet mechanism in the following manner: arm 77 is rigidly connected to an upward extension 107 which in turn terminates in a cam follower 108, extending outwardly at right angles to extension 107. A coil spring 109 is anchored between a spring seat 110 carried on arm 107 and a fixed spring seat 111 suitably anchored in any desired manner to the frame below extension 107. A cam 112 is mounted on a shaft 113, journaled into bearings provided by brackets 114 and 115, both of which are anchored to the frame. Shaft 115 carries keyed thereto a ratchet 116, and it has, in addition, a manually operable knob 117 which is mounted on the face of the front panel of the instrument. Manual control knob 117 may be provided with a suitably marked scale on the panel of the record player indicating, for example, positions numbered 1 to 15 inclusive. Thus by appropriate clockwise rotation of knob 117, the user can set cam 112 in any of fifteen positions, corresponding to the fifteen teeth on ratchet 113, and can thereby set the axial position of plunger 76 and pawl 68 to any of fifteen equally spaced points. The face of cam 112 and the dimensions of plunger 76 are so proportioned as to cause the fifteen optional positions of cam 112 to release the record-selecting pawls 83 at those fifteen positions corresponding to selection of the fifteen records on the stack. It will be understood, of course, that the number fifteen may be replaced by any other convenient number, depending on the number of records for which one chooses to design the instrument.

Ratchet 116 is provided with a pair of cooperating pawls. A holding pawl 118 is pivoted to bracket 115 and is urged against ratchet 116 by coil spring 119. The second pawl which cooperates with ratchet 116 is pawl 121, pivoted onto a link 122. The lower end of link 122 is pivoted to bracket 115, and the upper end is linked by means of a short link 123 to the armature 124 of a solenoid magnet 125. When solenoid 125 is energized, armature 124 is urged forward, thus advancing pawl 121 and moving ratchet 116 through one segment of rotation. Holding pawl 118 holds ratchet 116 in its advanced position when solenoid 125 is de-energized. A suitable spring (not shown) mounted within the solenoid coil will hold armature 124 normally retracted. Solenoid 125 is mounted on bracket 114.

Pawl 121 is normally held pressed against ratchet 116 by means of a coil spring 126.

I shall now describe briefly, with reference to Fig. 20, the electrical circuit which is used in connection with the record-player apparatus. Except for the motors 64 and 94, and the solenoid 125, I have not shown in the other figures of the drawing the electrical switches, and wires, which are used in the operation of the instrument. Those parts are shown schematically in Fig. 20, and persons familiar with the art will of course understand the manner in which they may be physically attached to the mechanical parts.

I provide a double-throw single-pole main switch 127 which is placed in one side of the main power line. Switch 127 may be controlled by a manual knob 128 on the front panel of the instrument. It will normally have three positions—an "off" position, a "manual" position, and an "automatic" position. In Fig. 20, the manual position is indicated by the reference letter "M" and the automatic position by the reference letter "A."

The side of the main power line not containing switch 127 is connected to one terminal of solenoid 125 and is also connected to one terminal of motor 64 and one terminal of motor 94.

The "manual" terminal of switch 127 is connected to one terminal of normally closed lower limit switch 129 and is also connected to the other terminal of motor 64. The other terminal of lower limit switch 129 is connected through interlocked switch 130 to the other terminal of motor 94. (Interlock switch 130, as is diagrammatically indicated in Fig. 20, may be a microswitch actuated by the retraction of platform 34. Its function is to insure that automatic operation of the instrument will not occur except when platform 34 is duly retracted.)

The automatic terminal of switch 127 is connected to one terminal of a normally closed upper limit switch 132, and also to one terminal of a normally open tone-arm control switch 135.

The other terminal of switch 135 is connected to the other terminal of switch 132, and they in turn are connected through "repeat" switch 131 to the other terminal of solenoid 125. (Switch 131 is optional, and if used, will normally be provided with a manual control knob 131*a* carried on the front panel. If used, the switch will usually be closed, but may be, if desired, thrown to the "repeat" or open position, in which event the instrument will play the same record over and over again unless a different record selection be made by hand by rotation of knob 117.)

The terminal of switch 132 which is connected via switch 131 to solenoid 125 is also connected to the other terminal (not heretofore mentioned) of switch 129.

In the operation of my record player, it will be understood that when the switch 127 is thrown to the manual position, motor 64 will be started in any event and motor 94 will be started, through lower limit switch 129, until the sleeve 69 and its associated spindle members have been lowered to their fully retracted position. At that time, sleeve 69 or any suitable part associated therewith, will engage lower limit switch 129 and open it. That will disable motor 94 and turn it off for so long as the instrument is being manually operated.

The "manual" position of switch 127 may, if desired, also be provided with a suitable mechanical linkage to disable the automatic actuation of tone arm 31 by motor 64.

When switch 127 is placed in the automatic position, motor 64 will be started and, in addition, motor 94 will be started unless sleeve 69 and its spindle members are already in their uppermost position. In any event, when the spindle members reach their fully raised position, limit switch 132 will be opened and motor 64 will stop. When, however, tone arm 31 is moved outward to its fully withdrawn position, it will close switch 135, as is diagrammatically shown in Fig. 20. (It will be understood that switch 135 will actually be mounted within the cabinet and actuated by any suitable moving part associated with tone arm 31.)

Closure of switch 135 will start motor 94 and cause the spindle to move downward. As soon as the spindle leaves its topmost position, switch 132 will close, so that the cycle will continue even though the tone arm be moved away from its extreme outer position. As the spindle moves downward, the pawls 83 will be retracted by the topmost of the stack of records on turntable 32, and the latch member 79 will hold the pawls 83 in retracted position. After the spindle has passed through its lowermost position, as shown in Fig. 9, it will during its upward movement bring latch member 79 into engagement with record-selecting pawl 68, and pawls 83 will be released. The particular record left on top of the turntable by this operation will depend on the position of the cam 112. (At the same time the motor 94 is started, the solenoid 125 is actuated and ratchet 116 is moved one notched in the clockwise direction.)

After the stack of records has been "split" by the record-supporting pawls 83, the spindle will rise to its topmost position and upper limit switch 132 will be opened. This will stop motor 94 and de-energize solenoid 125 while the record just selected is being played.

When the selected record has been completed, tone arm 131 will move back, again close switch 135, and the operation will continue.

As may be seen from a study of Figs. 9 and 10, the plunger 76 will, when it runs off the high end of cam 112, drop to the lower face of the cam and thus cause the instrument to pick up with record 1 after record number 15 has been played. Thus, instead of stopping or playing the last record over again, as an ordinary record changer does, my record changer, upon playing the last record, plays the entire stack over again in sequence.

Another great advantage of my record player over conventional record changers, it will be noted, is that the sequence of records played can at any time be controlled by the manual selector 117. Since the solenoid 125 automatically advances the ratchet 116 by one notch at the beginning of each record-changing cycle, the scale for selector knob 117 will of course be calibrated so as to place the ratchet one notch counterclockwise of the notch which will yield the desired record. That is, the point marked "6" on the scale for selector 117 will actually place ratchet 116 in the position to play record 5. Then, at the beginning of the next cycle, the solenoid 125 will automatically advance the ratchet to position 6, and record number 6 will thereupon be selected and played.

If some selection other than number 7 be desired after number 6 has been chosen, the user may "dial" his selection on selector 117. If no manual selection be made, the instrument will thereupon play record 7, record 8, and so on indefinitely.

While I have in this specification described my invention in detail with respect to an embodiment designed for use with records having a large central aperture, it will be understood by those skilled in the art that the principles embodied in my invention can readily be employed to construct a record player for automatic playing of the older-type records having a small central aperture. The most obvious modification of my invention to adapt it to the use of such records would consist in providing a plurality of record-support posts, spaced symmetrically around the spindle and adapted to support the records by means of record-supporting pawls simultaneously operative to secure the records at their rims. Thus, my invention is not to be regarded as limited to use with records having large central apertures, but is to be interpreted primarily with reference to the limitations of the appended claims.

I claim:

1. Record player apparatus comprising a turntable, means for rotating the same, a spindle mounted coaxially of the turntable and mounted for axial movement relative to said turntable between a fully advanced position and a fully retracted position, means for moving the same axially through a full cycle of movement from one extreme position to the other extreme position and back to the first extreme position, control means for actuating said moving means at predetermined times, causing the same to move said spindle axially through a full cycle of movement, retractable pawl means carried by said spindle operative when advanced to extend externally thereof, means holding said pawl means normally advanced, means for retracting the pawl means during movement of the record-supporting means in one direction, latch means for releasably holding the pawl means retracted, and means axially fixed relative to said turntable for releasing said latch means and advancing said pawl means at a predetermined position of said spindle during movement of the same in the other direction, said last-mentioned means having automatic control means operative during a part of each cycle of movement to change by a predetermined axial distance the position of said spindle at which said latch means is released and said pawl means advanced.

2. Apparatus according to claim 1 comprising also manual means operable between cycles to modify the operation of said automatic control means to permit manual setting of said latch-releasing position for the next cycle to any of a plurality of predetermined values.

3. Apparatus according to claim 1 wherein said automatic control means is operative on successive cycles to change said latch-releasing position by predetermined steps from a first position to a final position and then to return the same to the first position, and wherein manual means are provided operable to modify the operation of said automatic control means to permit, between cycles of movement, manual setting of said latch-releasing position for the next cycle to any of the values within the range of sequential selection by said automatic control means.

4. Record player apparatus comprising a turntable, means for rotating the same, record-supporting means mounted for axial movement relative to said turntable between a first extreme position and a second extreme position, means for moving the same axially through a full cycle of movement from said first extreme position to the other and back to the first extreme position, control means for actuating said moving means at predetermined times, causing the same to move said record-supporting means through a full cycle of movement, retractable pawl means carried by said record-supporting means operative when advanced to extend externally of said record-supporting means, means holding said pawl means normally advanced, means for retracting the pawl means during movement of the record-supporting means from said first extreme position to said second extreme position, latch means for releasably holding the pawl means retracted, means axially fixed relative to said turntable for releasing said latch means and advancing said pawl means at a predetermined position of said record-supporting means during movement of the same in the other direction, and control means for said latch-releasing means comprising a cam, a cam follower, and means for rotating said cam to any one of a plurality of predetermined angular positions, operative to set to one of a plurality of predetermined positions the position of said record-supporting means at which said latch means is released and said pawl means advanced.

5. Record player apparatus comprising a turntable, an electric motor for rotating the same, a spindle mounted coaxially of the turntable for axial movement relative thereto, a second electric motor, mechanical linkage connecting said second motor to said spindle whereby operation of said second motor will move said spindle from a maximum raised position to its lowermost position and back again to said fully raised position, control means comprising a limit switch for starting said motor at predetermined times and causing the same to move said spindle through a full cycle of movement, a plurality of record-selecting pawls carried in said spindle, said pawls being provided with springs normally holding them in advanced position, projecting externally of said spindle, said pawls being provided on their lower surfaces with beveled edges whereby said pawls may be retracted during downward movement of said spindle by engagement with a record or with the turntable, a spring-urged latch member carried within said spindle for releasably holding said record-selecting pawls in retracted position, a pawl mounted within said spindle but independently thereof and axially fixed relative to said turntable for engaging and releasing said latch means during upward movement of said spindle, means for moving said last-mentioned pawl axially with respect to said turntable for varying the position of said spindle at which said pawl engages and releases said latch means.

6. Apparatus according to claim 5 wherein said last-mentioned means comprises automatic control means having a stepping relay operative once each cycle of movement to shift by a predetermined axial distance the position of said last-mentioned pawl for varying sequentially from cycle to cycle the position of said spindle at which, during said spindle's upward movement, said last-mentioned pawl engages and releases said latch means.

7. Apparatus according to claim 5 wherein said last-mentioned means comprises a cam follower, means limiting movement of the cam follower to a linear direction parallel to the axis of said spindle, a cam engaging said cam follower, a shaft keyed to said cam and carrying a ratchet, a holding pawl and an advancing pawl for said ratchet, a solenoid operative when energized to move said advancing ratchet and thereby to rotate said shaft through a predetermined arc, and circuit means for energizing said solenoid once for each cycle of movement of said spindle.

8. Apparatus according to claim 5 wherein said last-mentioned means comprises a cam follower, means limiting movement of the cam follower to a linear direction parallel to the axis of said spindle, a cam engaging said cam follower, a shaft keyed to said cam and carrying a ratchet, a holding pawl and an advancing pawl for said ratchet, a solenoid operative when energized to move said advancing pawl to advance said ratchet and thereby to rotate said shaft through a predetermined arc, circuit means for energizing said solenoid once for each cycle of movement of said spindle, and manual adjustment means mounted also on said shaft whereby the position of said cam can be set manually to any of the positions determined by said ratchet and said holding pawl.

References Cited in the file of this patent

UNITED STATES PATENTS

| | | |
|---|---|---|
| 1,320,958 | Albrecht et al. | Nov. 4, 1919 |
| 1,879,291 | Johnson et al. | Sept. 27, 1932 |
| 2,097,288 | Mitchell | Oct. 26, 1937 |
| 2,132,993 | Mitchell | Oct. 11, 1938 |
| 2,288,526 | Hokanson | June 30, 1942 |
| 2,402,746 | Goldich | June 25, 1946 |
| 2,620,193 | Pattersson | Dec. 2, 1952 |